United States Patent [19]

Bula

[11] 4,111,251
[45] Sep. 5, 1978

[54] NET- OR CHAIN-LIKE VEHICLE TRACTION DEVICE FOR VEHICULAR WHEELS

[75] Inventor: Karl Bula, Seuzach, Switzerland

[73] Assignee: Sulzer Brothers Ltd., Winterthur, Switzerland

[21] Appl. No.: 771,171

[22] Filed: Feb. 22, 1977

[30] Foreign Application Priority Data

Feb. 24, 1976 [CH] Switzerland .................... 2246/76

[51] Int. Cl.² ............................................. B60C 27/10
[52] U.S. Cl. ................................. 152/219; 24/249 R; 85/36; 152/213 R
[58] Field of Search ............... 152/219, 213 R, 213 A, 152/241, 217, 242, 233; 24/115 G, 249 R, 249 LS; 85/36, 8.9; 248/410; 285/DIG. 3

[56] References Cited

U.S. PATENT DOCUMENTS

| 1,342,753 | 6/1920 | McGeorge | 152/219 |
| 1,605,407 | 11/1926 | Hughes | 152/219 |
| 1,974,833 | 9/1934 | Reyburn | 152/217 |
| 2,483,395 | 10/1949 | Benson | 285/DIG. 3 |
| 2,537,740 | 1/1951 | Churchman et al. | 285/DIG. 3 |
| 3,199,818 | 8/1965 | Ahara | 285/DIG. 3 |
| 3,363,291 | 1/1968 | Bond | 24/249 R |
| 3,752,204 | 8/1973 | Ouellettee | 152/219 |

FOREIGN PATENT DOCUMENTS

861,734 2/1941 France.

Primary Examiner—Albert J. Makay
Assistant Examiner—Lawrence E. Williams
Attorney, Agent, or Firm—Werner W. Kleeman

[57] ABSTRACT

A vehicle traction device for rubber tired vehicular wheels, comprising a traction unit in the form of, for instance, a wire netting or chain equipped with a tightening mechanism for the traction unit and effective at least at one side of the wheel in the circumferential direction in the mounted condition of the vehicle traction device. This tightening mechanism comprises a tensioning element extending in the circumferential direction of the wheel and elastically constructed at least over a part of its extent and a tightening or tensioning wire which likewise extends in the circumferential direction. One end of the tightening wire is fastened to a body member of a tightening lock of the tightening mechanism and the other end is guided through a blocking element arranged in the tightening lock. When the vehicle traction device is mounted, the blocking element allows displacement of the tightening lock relative to the tightening wire only in the sense of shortening the effective length of the tightening wire. An unlocking element cooperates with the blocking element, this unlocking element, when assuming its unlocking position, allows release of the tightening wire by the blocking element such that displacement of the tightening lock is also possible in the other direction.

7 Claims, 9 Drawing Figures

NET- OR CHAIN-LIKE VEHICLE TRACTION DEVICE FOR VEHICULAR WHEELS

BACKGROUND OF THE INVENTION

The present invention relates to a new and improved construction of a net- or chain-like vehicle traction device for rubber tired vehicular wheels — also sometimes referred to in the art as an anti-skid device —, which is of the type comprising a traction unit or traction means, for instance in the form or wire netting or chains for increasing traction between the outer peripheral surface of the wheel and the ground upon rotation of the wheel about its axis and a tightening mechanism effective at least at one side of the wheel in the circumferential or peripheral direction when the vehicle traction device is mounted at the wheel.

Net-like vehicle traction devices, such as snow chains, composed of net-like coverings formed of rubber encased wires or the like, oftentimes possess tightening or tensioning means effective at least at one side of the wheel in the circumferential direction for facilitating the mounting of the vehicle traction device. The tightening or tensioning means can embody spring elements which, during mounting of the vehicle traction device, are elongated or extended and exert a traction or tensioning force in the mounted condition.

Such construction of vehicle traction device facilitates the mounting thereof in contrast to those state-of-the-art constructions where it is necessary to manually tighten a non-expansible chain and to positively suspend a hook into one of the chain links intended to receive the same, in order to obtain a relatively tight contact of the vehicle traction device against the vehicular wheel or tire. Such flexible tightening means are particularly advantageous from the standpoint of facilitating the mounting of the vehicle traction device when they serve for producing a circumferential force at the inboard side of the wheel, where it is difficult and cumbersome work to hang-in hooks or the like.

However, elastic tightening means are associated with the drawback that they fail to provide a faultless fixation of the vehicle traction device in the presence of forces which arise when such vehicle traction device is moving along the road. It is for this reason that tightening or tensioning devices employing spring elements, for instance used for vehicle traction devices for automobile tires, have not found wide spread acceptance in practice. Attempts have been made to improve fixation of the traction device by increasing the spring tension, yet when this is done it is necessary to exert so much force manually during mounting of the traction device that it is virtually impossible to mount the same outside of a garage or other service station or without resorting to the aid of additional tools or other mounting expedients.

SUMMARY OF THE INVENTION

Therefore, with the foregoing in mind, it is a primary object of the present invention to provide a new and improved construction of vehicle traction device for vehicular wheels which is not associated with the aforementioned drawbacks and limitations of the prior art constructions.

Another and more specific object of the present invention aims at the provision of a new and improved construction of a vehicle traction device for rubber tired vehicular wheels which is easy to mount at the wheel and affords an automatic re-tightening of the traction device when in use.

Still a further significant object of the present invention contemplates a vehicle traction device for pneumatic tires which is relatively simple in construction and design, economical to manufacture, extremely easy to use, and particularly enables mounting of the vehicle traction device at the tire with relatively little effort.

Yet another significant object of the present invention contemplates the provision of a vehicle traction device incorporating means for the rapid and easy mounting as well as tightening of the vehicle traction device at the wheel.

Now in order to implement these and still further objects of the invention, which will become more readily apparent as the description proceeds, the invention contemplates that the tightening mechanism comprises a tensioning element constructed to be elastic over at least a part of its extent and extending in the circumferential direction of the related wheel. The tightening mechanism further includes a tightening or tensioning wire which also extends in the circumferential direction, one end of which is attached to a body member of a tightening lock and the other substantially wire-like configured end is guided through at least one blocking element located in the tightening lock. The blocking element, when the vehicle traction device is mounted, only permits a displacement of the tightening lock relative to the tightening wire in the sense of enabling shortening of the effective length of the tightening wire. An unlocking element cooperates with the blocking element, the unlocking element, when assuming its unlocking position, enabling release of the tightening wire by the blocking element such that displacement of the tightening lock can be also accomplished in the other direction.

By means of the invention it is possible to mount with very little effort the vehicle traction device. At the same time there is ensured for positive fixation of such mounted vehicle traction device. The coaction of elastic tensioning element, tightening wire and tightening lock, renders it possible to use relatively weak spring means for the tensioning element, so that the mounting of the vehicle traction device can be accomplished with relatively little effort. When the traction device is mounted there is afforded an automatic re-tensioning or post-tightening inasmuch as the tightening wire can freely move in one direction under the action of the tensioning element through the tightening lock in the sense of shortening its effective length. Since any return movement of the tightening wire is prevented by the tightening lock, unless the unlocking device or element is actuated, there is beneficially realized an automatic adjustment of the position of the vehicle traction device during the immediate subsequent travel of the vehicle with the thereat mounted traction device.

The inventor of this invention has already proposed the use of a tightening mechanism or device employing a tensioning element in the form of a helical spring and a tightening wire guided through the interior thereof. Yet, since such tensioning mechanism does not contemplate the provision of a tightening lock which functions automatically in a free-wheeling manner, it is not possible to realize either the effect or advantages which can be obtained with the present invention.

It is advantageous if the vehicle traction device possesses a tightening lock-body member having two side plates or cheeks located in spaced relationship from one another, each having a respective opening for the through-passage of the tightening wire. At least one blocking element or body having a hole or opening and threaded onto the tightening wire is arranged between both of the side plates. This blocking body is exposed to the action of a spring element such that its marginal region of the end surface confronting one such side plate and disposed transversely with respect to the tightening wire is pressed against a stop or impact member located at the region of such side plate in such a manner that the blocking body assumes an inclined position relative to the wire and which is adjusted as a function of the play between the tightening wire and the hole or opening of the blocking body. In this inclined position of the blocking body there is prevented shifting of the tightening lock relative to the wire opposite to the inclination of the blocking body, but however is possible in the direction of such inclination so that the unlocking element which coacts with the blocking body, when in its unlocking position, enables the blocking body to erect itself at least to such an extent that there is possible shifting of the tightening lock in the other direction.

According to a particularly advantageous constructional manifestation of the invention the tensioning element can be constructed as a coil or helical-tension spring, and the tightening wire is located in the space surrounded by the spring coils. With this arrangement there is not required any additional guide means for the tightening wire.

As far as the tightening lock is concerned, an advantageous construction is realized when the stop or impact member is formed by the unlocking element located externally of the unlocking position. The unlocking element can also be formed by a lever which is pivotably threaded onto the tightening wire, this lever having a substantially wedge-shaped projection or extension which, in the unlocking position of the lever, bears against the side plate of the locking body member neighboring the stop and causes an uprighting or erection of the blocking body member. The lever can be formed by a leg of a substantially U-shaped bracket, the other leg of which is likewise pivotably threaded onto the tightening wire.

The blocking body member of the aforedescribed tightening lock can also be constructed of a number of parts; for instance, it can comprise at least two individual plates which are threaded side-by-side onto the tightening wire. Finally, the hole or opening of the blocking body or blocking body member advantageously can be defined by a conical surface opening in the direction of the spring element.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIGS. 7 and 8 repectively show two different possible constructions of blocking bodies; and, FIG. 9 is a perspective view of an unlocking element or device in the form of a bracket member used in the vehicle traction device of the invention.

DETAILED DESCRIPTION OF THE PREFERRED EMBODIMENTS

Figure 1:
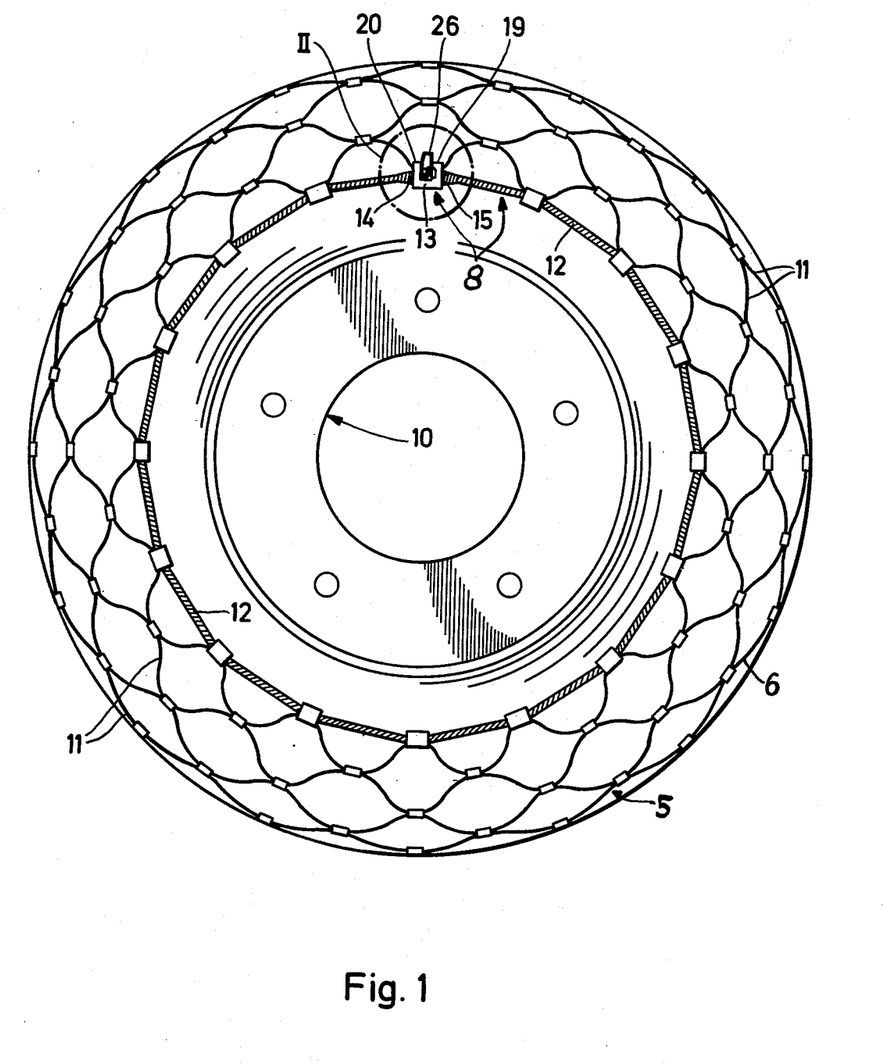
FIG. 1 illustrates an automobile tire having mounted thereat the vehicle traction device of the invention which, for instance, consists of net-like interconnected wires surrounded by a rubber casing or sheath.
Figure 2:
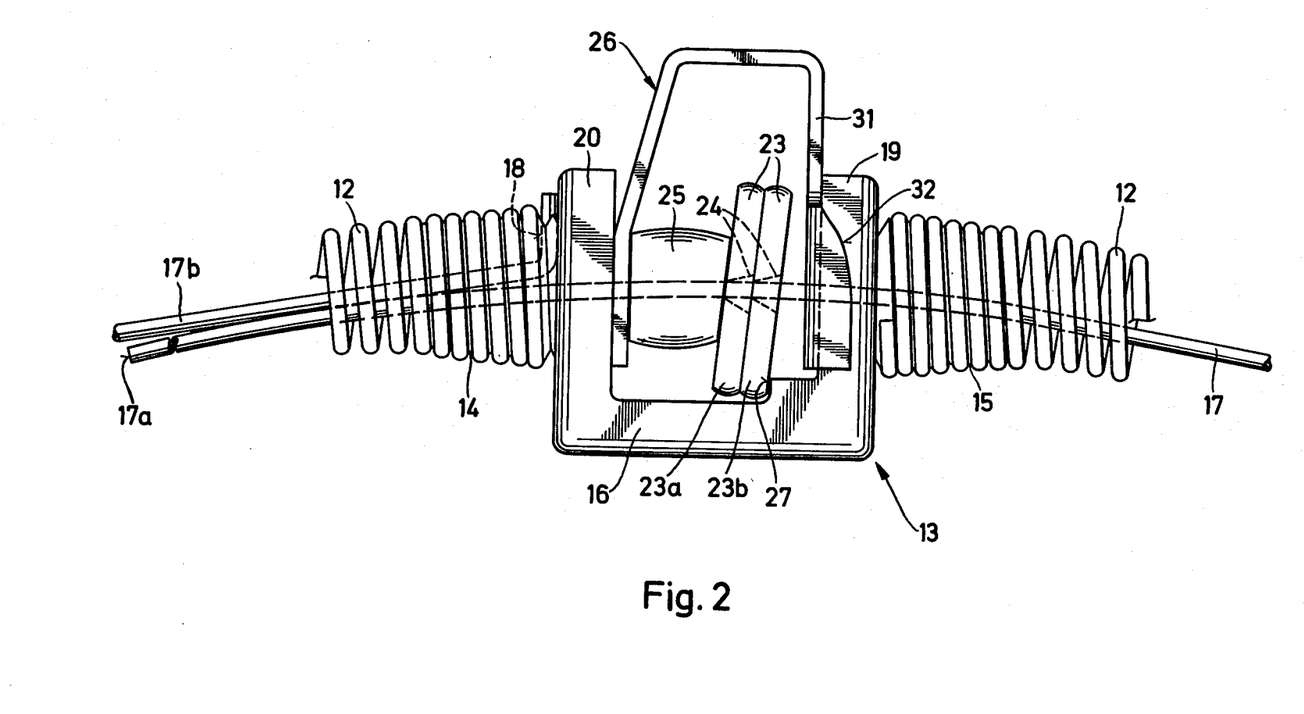
FIG. 2 illustrates on an enlarged scale the tightening wire, tensioning element and tightening lock of the tightening mechanism or device shown in FIG. 1.
Figure 3:
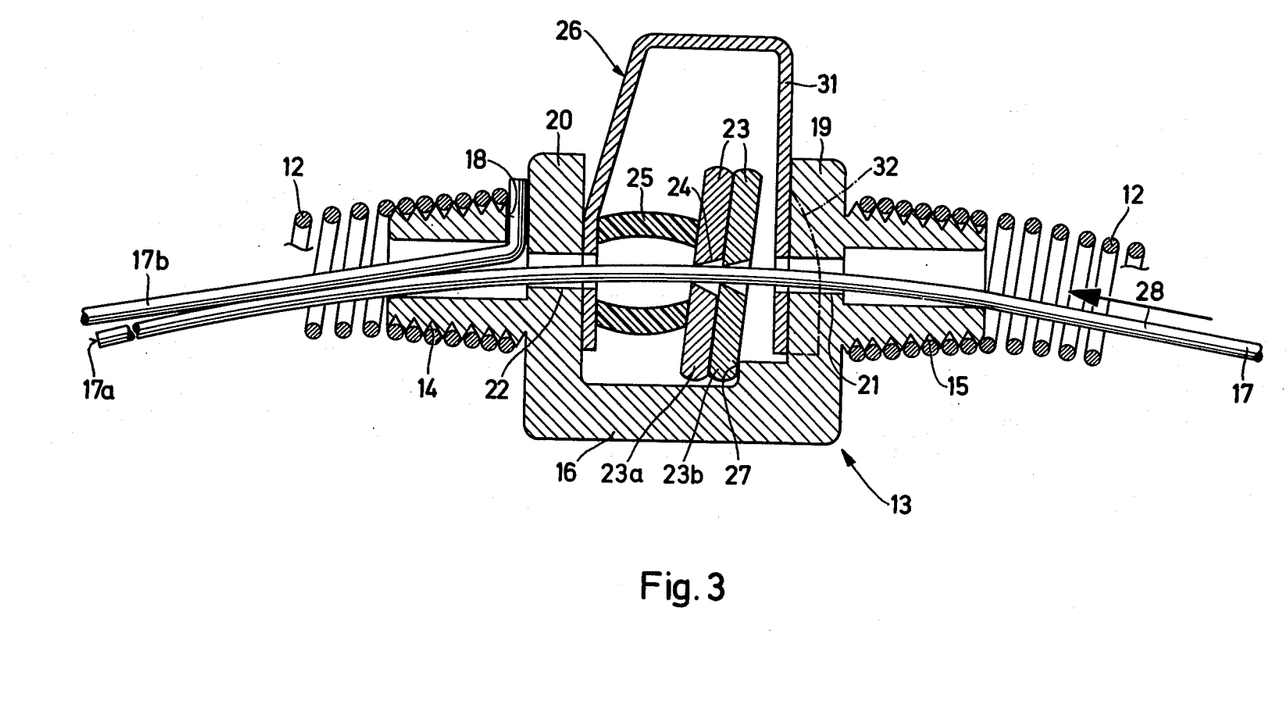
FIG. 3 is a sectional view of the tightening lock illustrated in FIG. 2.

Describing now the drawings, the exemplary embodiment of vehicle traction device 11 shown in FIG. 1 mounted upon the related vehicular wheel or pneumatic tire 10 comprises suitable traction means 5, which may be in the form of wire netting, generally indicated by reference character 6, for instance composed of rubber enclosed wires, or such traction means 5 may be constituted for instance by conventional chains as used with commercially available snow chains. Regardless of the nature of the traction means 5 the same will be understood to increase traction between the outer peripheral surface of the wheel or tire 10 and the ground upon rotation of the wheel about its axis. The vehicle traction device 11 is provided at the inside or inboard side of the wheel 10 with a tightening or tensioning mechanism, generally indicated by reference character 8, and equipped with the tensioning element 12 and the tightening lock 13. At the outboard side of the wheel 10 there may be advantageously provided for the vehicle traction device a similar tightening mechanism. Yet, it would be possible, under circumstances, to use at the outboard side of the wheel 10 also a non-elastic terminal ring of fixed length. Now as best seen by referring to FIG. 2, the tensioning or tension element 12, in the embodiment under discussion, comprises a coil or helical spring which is threaded at its ends onto threaded extensions or projections 14 and 15 or equivalent structure of the tightening lock body or body member 16. Guided through the interior of the coil or helical spring 12 and through the tightening lock 13 is a tightening or tensioning wire 17, the free end 17a of which possesses a length dimensioned such that the mounting of the vehicle traction device and its post-tightening is possible in a manner still to be more fully described hereinafter. The other end 17b of the tightening wire 17, as shown in FIG. 3, is suitably fastened to the tightening lock body or body member 16 of the tightening lock 13. For this purpose the threaded projection or extension 14 is provided with a bore 18 through which there is guided the bevelled end portion of the tightening wire-end 17b.

The body member 16 of the tightening lock 13 possesses two cheeks or side plates 19 and 20 located in spaced relationship from one another. Each side plate 19 and 20 has a hole or opening 21 and 22 respectively, through which there is guided the tightening wire 17. Threaded onto the tightening wire 17 are two blocking elements or bodies 23a and 23b which, as shown, each have a hole or opening 24 formed by a substantially conical surface which tapers in the direction of a spring or resilient element 25 or equivalent structure. The spring element 25 is likewise threaded onto the tightening wire 17 and bears at one end by means of the bracket or bracket member 26 against the side plate 20 and at the other end against the blocking body 23a. The latter bears at the blocking body 23b which, in turn, is pressed by means of its lower edge or marginal region against a stop or impact member 27 which is provided at the locking body member 16. The blocking bodies 23a and 23b, under the action of the spring element 25, assume an inclined position relative to the tightening wire 17, as shown in FIG. 3. This inclined position of the blocking bodies 23a and 23b is governed by the play existing between the tightening wire 17 and the smallest hole diameter of the blocking bodies and also by the length of the holes or openings 24. In this position of the blocking bodies 23a and 23b there is possible shifting or displacement of the tightening wire 17 relative to the tightening lock 13 only in the direction of the arrow 28, and any shifting in the opposite direction is effectively prevented. The clamping action exerted upon the wire 17 is produced by the edges of the holes or openings 24. While in the exemplary embodiment shown there are employed two blocking bodies 23a and 23b a greater or lesser number could be utilized.

Figure 4:
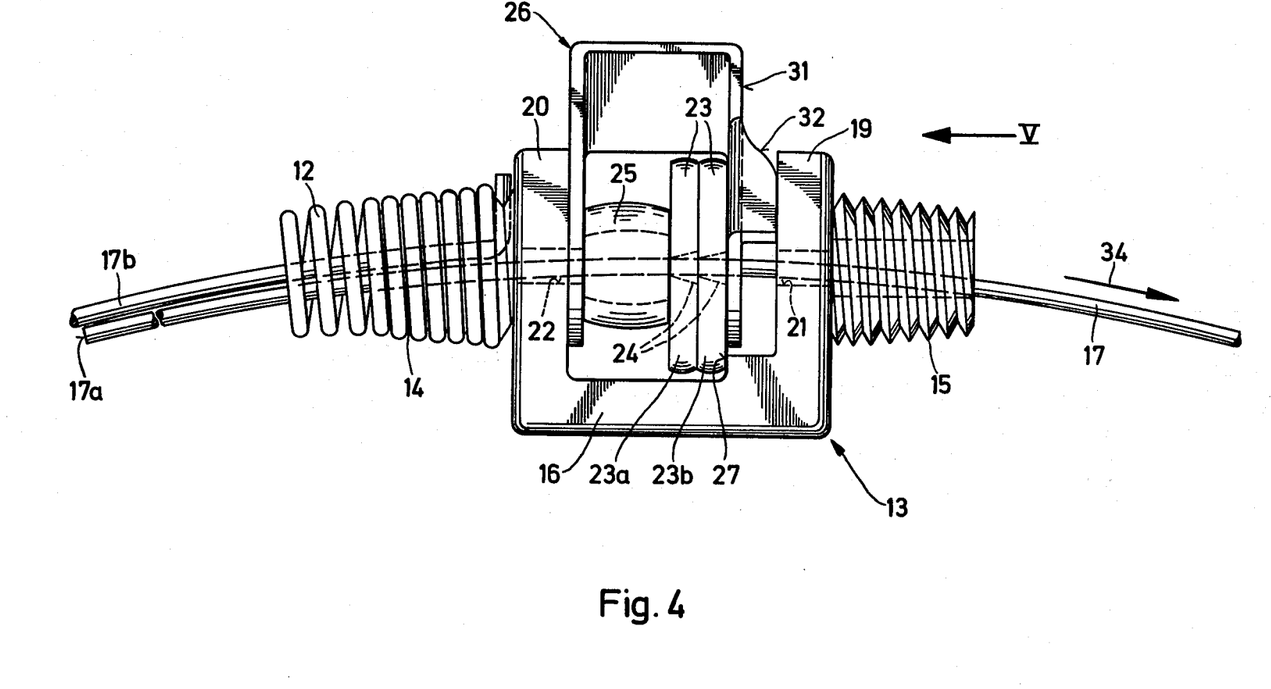
FIG. 4 illustrates the tightening lock portrayed in FIG. 3 in its unlocked position.
Figure 5:
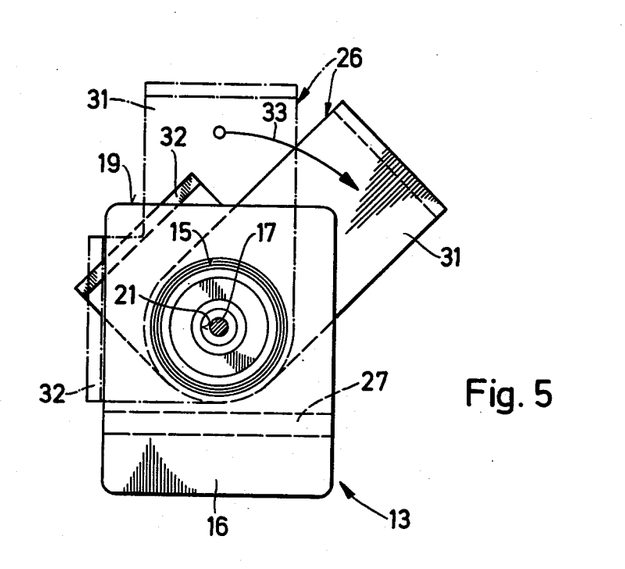
FIG. 5 is an end view of the tightening lock of FIG. 4 looking substantially in the direction V thereof.
Figure 9:
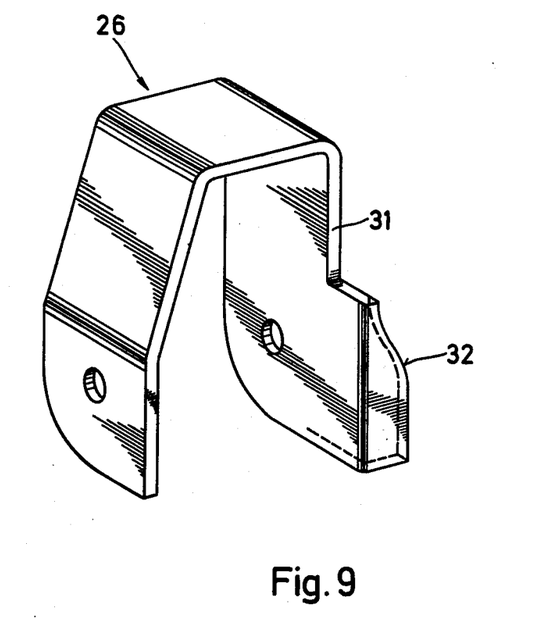

Now the bracket member 26, shown in perspective view in FIG. 9, serves as the unlocking element or device. For this purpose, it possesses a pivotable arm 31 equipped with a substantially wedged-shaped projection or shoulder 32. FIGS. 4 and 5 illustrate the tightening lock 13 with the bracket member 26 located in the unlocking position, this bracket member 26 having been rocked in the direction of the arrow 33 out of the position shown in FIG. 3. During this rocking or pivotable movement, which can be accomplished through a full 90°, the substantially wedged-shaped projection or shoulder 32 travels onto the side plate or cheek 19 of the lock body member 16 neighboring the stop or impact member 27. Consequently, arm or lever 31, forming one leg of the substantially U-shaped bracket 26, shifts towards the side plate 20 and causes uprighting or erection of the blocking bodies 23a and 23b. The wedge-shaped shoulder or projection 32 can be dimensioned such that there is not only accomplished such uprighting, but even a not particularly illustrated lifting-off of each blocking body 23 from the stop or impact member 27.

In the erected or upright position of the blocking bodies 23a and 23b, as shown in FIG. 4, the tightening or tensioning wire 17 also can be displaced in the direction of the arrow 34 relative to the tightening lock 13. With this position of the blocking bodies 23a and 23b, there is eliminated the clamping action which was effective when such blocking bodies were in the inclined position previously discussed.

Now the mounting of the vehicle traction device shown in FIG. 1 is accomplished in the following manner:

The bracket or bracket member 26 serving for unlocking such traction device, is rocked into the position shown in FIGS. 4 and 5. The traction means 5 of the vehicle traction device 11 is placed from the outboard side of the wheel 10 over the upper portion of the tread of the tire or wheel, and specifically, while expanding the coil or helical spring 12. Thereafter, the vehicle is moved either forwardly or rearwardly through about one-half of the wheel circumference. As a result, the remaining portion of the traction means 5 of the vehicle traction device 11, under the action of the spring 12, engages about the wheel 10 or can be easily brought into such position around the wheel manually. Then, the bracket member 26 is shifted into the locking position shown in FIG. 3. During driving, the vehicle traction device 11 automatically engages uniformly about the tire or wheel 10 and each tightening thereof in the circumferential direction, brought about by the spring 12, is automatically accompanied by a reduction in the effective length of the tightening wire 17. This automatic re-tightening or post-tightening — accomplished either at both sides of the wheel or only at one side thereof — is completed after only a few revolutions of the wheel. During further travel of the vehicle, the vehicle traction device 11 remains positively fixed in position under the action of the tightening lock 13 which prevents any enlargement of the effective length of the tightening wire 17.

Conversely, for de-mounting or dismantling the vehicle traction device 11 it is only necessary to shift the bracket 26 into the unlocking position shown in FIGS. 4 and 5. Now the vehicle traction device can be lifted back off the upper portion of the tread of the rubber tired wheel 12, while expanding the spring 12. By moving the vehicle a short distance it is possible for the vehicle traction device 11 to automatically jump-off the wheel, or such can be easily removed manually.

Figure 6:
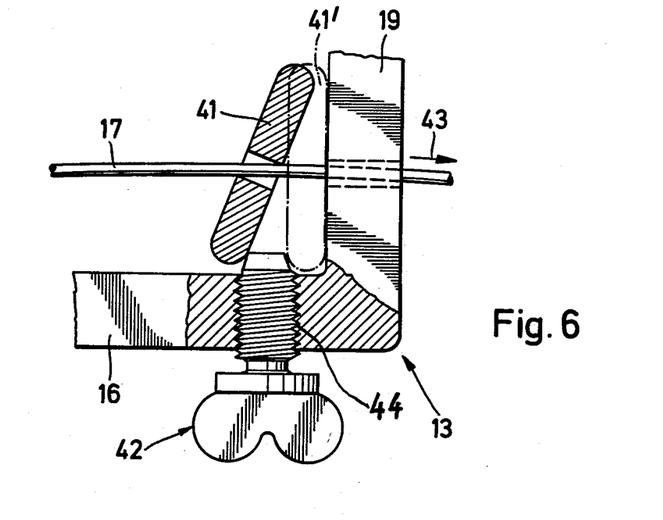
FIG. 6 illustrates a modified construction of a tightening lock incorporating an unlocking element forming a stop or impact member for the blocking body.

With the embodiment shown in FIG. 6 the stop or impact member for the blocking body 41 is here formed by the substantially conical-shaped end of a screw 42 or the like which is threaded into the threaded bore 44 of the lock body or body member 16. In order to render possible uprighting of the blocking body 41 and thus release of the tightening wire 17 in the direction, indicated by the arrow 43, relative to the tightening lock, the screw 42 is threaded-out to such an extent that the stop formed thereby is located completely within the tightening lock body member 16. Under the action of the spring element which has not been particularly shown in FIG. 6, the blocking body 41 then can be uprighted or erect itself into the position shown by phantom lines 41', where there is possible movement of the tightening wire relative to the tightening lock body member 16 in both directions.

Figure 7:
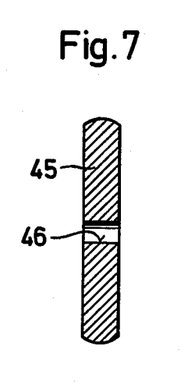
Figure 8:
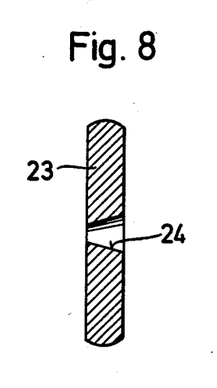

Finally, in FIGS. 7 and 8 there are shown two different constructional forms of blocking bodies 45 and 23 respectively. The blocking body 45 of FIG. 7 is provided with a straight bore or opening 46, whereas the blocking body 23 of FIG. 8, like the blocking bodies discussed in conjunction with the embodiment shown in FIGS. 2 and 3, has a substantially conical-shaped opening 24. The blocking bodies 45 and 23 can be constructed to be relatively thin. As already mentioned, two or more of them can be threaded onto the tightening wire 17. Also, as explained, it is however possible to use only a single blocking body or element.

The invention is not limited to the herein specifically described exemplary embodiments. Thus modifications can be made and will readily suggest themselves to those skilled in the art. For instance, instead of the coil or helical spring, there could also be used a Bowden cable-type conduit or jacket which is constructed to only be elastic over a part of its extent. The tightening wire 17 also could be guided externally of the tensioning element 12; in such case there would however be required a special guiding arrangement ensuring for a more or less concentric guiding of the tensioning element and the tightening wire. It also would be possible to replace the resilient or spring element 25 by a helical or coil spring. Finally, as already mentioned, instead of using a net-like traction means formed of wires which may be covered by a rubber enclosure by way of example, it would also be possible to use traction means in the form of link chains or the like as encountered with conventional snow chains.

While there are shown and described present preferred embodiments of the invention, it is to be distinctly understood that the invention is not limited thereto, but may be otherwise variously embodied and practiced within the scope of the following claims.

Accordingly, what I claim is:

1. A vehicle traction device for installation on a ground-engaging rotatable wheel of a vehicle, comprising:
   (A) traction means for placement on said wheel for increasing traction between the outer peripheral surface of the wheel and the ground upon rotation of the wheel about its axis of rotation;
   (B) a tightening mechanism effective at least at one side of the wheel in the peripheral direction thereof for tightening said traction means;
   (C) said tightening mechanism comprising:
      (a) a tensioning element extending in said peripheral direction and constructed to be elastic at least over a part of its extent;
      (b) a tightening wire extending in said peripehral direction and having two ends;
      (c) tightening lock means
   (D) said tightening lock means comprising:
      (a) a body member;
      (b) at least one blocking element movable between an inclined position and a substantially upright position arranged in said body member;
      (c) one end of said tightening wire being attached to said tightening lock means;
      (d) said blocking element having receiving means through which there is guided the other end of said tightening wire;
      (e) an unlocking element cooperating with said blocking element for moving said blocking element from said inclined position into said upright position;
      (f) said blocking element permitting relative displacement of the tightening lock means and the tightening wire in one direction only in the sense of decreasing the effective length of the tightening wire when the vehicle traction device is installed at the wheel and with said blocking element in said inclined position;
      (g) said unlocking element being movable from a locking position where said blocking element is in said inclined position into an unlocking position where the blocking element is in said upright position for releasing the tightening wire such that there is possible relative displacement of the tightening lock means and said tightening wire in a direction which is opposite to said one direction;
      (h) said unlocking element, when mounting the tensioning element and the tightening wire in the peripheral direction of the wheel, constituting a member separate from said blocking element; and
      (i) said separate member constituting said unlocking element being pivotable about the tightening wire and having a substantially wedge-shaped projection for unlocking the blocking element by shifting said blocking element into said upright position.

2. The vehicle traction device as defined in claim 1, wherein:
   said body member of said tightening lock means has two spaced side plates;
   each of said side plates being provided with an opening through which there is threaded said tightening wire;
   said blocking element comprising at least one apertured blocking body threaded onto such tightening wire and located between said two side plates;
   stop means arranged between said two side plates adjacent one of said side plates and against which there is urged the apertured blocking body;
   said apertured blocking body being provided with a hole defining said receiving means through which there is threaded said tightening wire;
   said apertured blocking body having an end surface confronting said one side plate;
   a resilient element for urging said apertured blocking body with said end surface confronting said one side plate against said stop means such that said blocking body assumes said inclined position relative to the tightening wire;
   said unlocking element in its unlocked position bearing by means of said wedge-shaped projection at said one side plate of the blocking body and uprighting said blocking element into said upright position.

3. The vehicle traction device as defined in claim 1, further including:
   a substantially U-shaped bracket having oppositely situated legs;
   one of said legs constituting said unlocking element;
   the other of said legs being pivotably threaded onto said tightening wire.

4. The vehicle traction device as defined in claim 1, wherein:
   said blocking element comprises at least two individual blocking bodies in the form of plates which are threaded in side-by-side relationship onto said tightening wire.

5. The vehicle traction device as defined in claim 1, wherein:
   said blocking element comprises a blocking body having a threading hole defining said receiving means and bounded by a substantially conical surface:
   resilient means for biasing said blocking body;
   said conical surface tapering in the direction of said resilient means.

6. The vehicle traction device as defined in claim 1, wherein:
   said tensioning element comprises a helical-traction spring having spring coils surrounding a space; and
   said tightening wire being located in the space surrounded by the spring coils.

7. A vehicle traction device for installation on a ground-engaging rotatable wheel of a vehicle, comprising:
   (A) traction means for placement on said wheel for increasing traction between the outer peripheral surface of the wheel and the ground upon rotation of the wheel about its axis of rotation
   (B) a tightening mechanism effective at least at one side of the wheel in the peripheral direction thereof for tightening said traction means;
   (C) said tightening mechanism comprising:

(a) a tensioning element extending in said peripheral direction and constructed to be elastic at least over a part of its extent;
(b) a tightening wire extending in said peripheral direction and having two ends;
(c) tightening lock means
(D) said tightening lock means comprising:
 (a) a body member;
 (b) at least one blocking element movable between an inclined position and a substantially upright position cooperating with said body member;
 (c) one end of said tightening wire being attached to said tightening lock means;
 (d) said blocking element having a hole through which there is guided the other end of said tightening wire;
 (e) an unlocking element cooperating with said blocking element for moving said blocking element from said inclined position into said upright position;
 (f) said blocking element permitting relative displacement of the tightening lock means and the tightening wire in one direction only in the sense of decreasing the effective length of the tightening wire when the vehicle traction device is installed at the wheel and with said blocking element in said inclined position;
 (g) said unlocking element being movable from a locking position where said blocking element is in said inclined position into an unlocking position where the blocking element is in said upright position for releasing the tightening wire such that there is possible relative displacement of the tightening lock means and said tightening wire in a direction which is opposite to said one direction;
 (h) said unlocking element, when mounting the tensioning element and the tightening wire in the peripheral direction of the wheel, constituting a member separate from said blocking element; and
 (i) said separate member constituting said unlocking element being pivotable about the tightening wire and having means for unlocking and blocking element by shifting said blocking element into said upright position.

* * * * *